United States Patent
Tenny (10) Patent No.: US 9,154,464 B2
(45) Date of Patent: *Oct. 6, 2015

(54) OBSCURING TEMPORARY USER EQUIPMENT IDENTITIES

(75) Inventor: Nathan Edward Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 681 days.

This patent is subject to a terminal disclaimer.

(21) Appl. No.: 11/673,532

(22) Filed: Feb. 9, 2007

(65) Prior Publication Data

US 2007/0218901 A1    Sep. 20, 2007

Related U.S. Application Data

(60) Provisional application No. 60/771,974, filed on Feb. 10, 2006, provisional application No. 60/786,463, filed on Mar. 27, 2006.

(51) Int. Cl.
*H04W 12/10* (2009.01)
*H04L 29/06* (2006.01)
(Continued)

(52) U.S. Cl.
CPC .......... *H04L 63/0407* (2013.01); *H04L 9/0838* (2013.01); *H04L 9/0891* (2013.01); *H04L 29/12254* (2013.01); *H04L 61/2038* (2013.01); *H04L 63/0414* (2013.01); *H04L 63/126* (2013.01); *H04L 63/1441* (2013.01);
(Continued)

(58) Field of Classification Search
USPC ........... 380/262; 713/170, 168–169; 455/436, 455/410–411
See application file for complete search history.

(56) References Cited

U.S. PATENT DOCUMENTS

| 5,889,861 A | 3/1999 | Ohashi et al. |
| 5,987,128 A | 11/1999 | Baba |

(Continued)

FOREIGN PATENT DOCUMENTS

| CN | 1489339 A | 4/2004 |
| EP | 1337125 | 8/2003 |

(Continued)

OTHER PUBLICATIONS

Barbeau, et al.: "Perfect identity concealment in UMTS over radio access links," Wireless and Mobile Computing, Networking and Communications, pp. 72, 2-6 (WIMOB' 2005), IEEE International Conference in Montreal, Canada, Aug. 22-24, 2005.

(Continued)

*Primary Examiner* — Nathan Taylor
(74) *Attorney, Agent, or Firm* — Anthony R. Morris (57) ABSTRACT

Techniques for concealing temporary identifiers (IDs) assigned to user equipments (UEs) by a wireless communication system are described. At a network entity, a first ID Assigned to a UE and possibly a salt value are transformed, e.g., based on a hash function, to obtain a second ID for the UE. An output message directed to the UE is generated based on an input message, the second ID, and the salt value (if present). The output message is sent via a common channel shared by the UE and other UEs. At the UE, a message is received via the common channel, and a salt value (if sent) is obtained from the received message. The first ID and the salt value are transformed to obtain the second ID, which is used to determine whether the received message is intended for the UE.

27 Claims, 6 Drawing Sheets

(51) Int. Cl.
*H04L 29/12* (2006.01)
*H04W 8/26* (2009.01)
*H04W 12/12* (2009.01)
*H04L 9/08* (2006.01)
*H04W 12/02* (2009.01)
*H04W 12/04* (2009.01)
*H04W 88/02* (2009.01)

(52) U.S. Cl.
CPC ............. *H04L63/1466* (2013.01); *H04W 8/26* (2013.01); *H04W 12/12* (2013.01); *H04L 63/061* (2013.01); *H04L 2209/80* (2013.01); *H04W 12/02* (2013.01); *H04W 12/04* (2013.01); *H04W 12/10* (2013.01); *H04W 88/02* (2013.01)

(56) References Cited

U.S. PATENT DOCUMENTS

| | | | |
|---|---|---|---|
| 5,987,129 | A | 11/1999 | Baba |
| 6,256,301 | B1 | 7/2001 | Tiedemann, Jr. et al. |
| 6,463,154 | B1 | 10/2002 | Patel |
| 6,510,461 | B1 | 1/2003 | Nielsen |
| 6,757,722 | B2 | 6/2004 | Lonnfors et al. |
| 6,763,112 | B1* | 7/2004 | Haumont ............... 380/247 |
| 6,856,604 | B2 | 2/2005 | Lundby |
| 7,046,992 | B2* | 5/2006 | Wallentin et al. ............ 455/411 |
| 7,240,202 | B1* | 7/2007 | Orman ................... 713/169 |
| 7,310,525 | B2* | 12/2007 | Takase et al. ............. 455/435.2 |
| 7,356,146 | B2* | 4/2008 | Yi et al. .................. 380/262 |
| 7,515,713 | B2* | 4/2009 | Quick et al. ............. 380/248 |
| 7,706,539 | B2 | 4/2010 | Jang et al. |
| 2003/0003895 | A1* | 1/2003 | Wallentin et al. ............ 455/410 |
| 2003/0101139 | A1* | 5/2003 | Kaag ....................... 705/50 |
| 2003/0105964 | A1 | 6/2003 | Brainard et al. |
| 2003/0112976 | A1* | 6/2003 | Quick et al. ............. 380/270 |
| 2003/0157927 | A1* | 8/2003 | Yi et al. .................. 455/411 |
| 2004/0006642 | A1* | 1/2004 | Jang et al. ............... 709/245 |
| 2004/0064730 | A1 | 4/2004 | Kamiyama et al. |
| 2005/0165838 | A1* | 7/2005 | Fontoura et al. .......... 707/104.1 |
| 2005/0281216 | A1* | 12/2005 | Varonen et al. ............ 370/328 |
| 2006/0025162 | A1* | 2/2006 | Cao et al. ................ 455/466 |
| 2006/0034456 | A1* | 2/2006 | McGough ............... 380/30 |
| 2006/0116117 | A1* | 6/2006 | Takase et al. ............. 455/420 |
| 2006/0248079 | A1* | 11/2006 | Braica .................... 707/7 |
| 2007/0047478 | A1 | 3/2007 | Balachandran et al. |
| 2007/0101133 | A1* | 5/2007 | Liu et al. ................ 713/168 |
| 2007/0168662 | A1* | 7/2007 | Escott et al. ............. 713/168 |
| 2007/0218901 | A1* | 9/2007 | Tenny .................... 455/436 |
| 2007/0226502 | A1* | 9/2007 | Tenny .................... 713/170 |
| 2008/0065548 | A1* | 3/2008 | Muijen .................... 705/51 |
| 2008/0187137 | A1* | 8/2008 | Nikander et al. ........... 380/270 |
| 2008/0273610 | A1* | 11/2008 | Malladi et al. ............ 375/260 |

FOREIGN PATENT DOCUMENTS

| | | | |
|---|---|---|---|
| EP | 1337125 A2 * | 8/2003 | ............. H04Q 7/38 |
| EP | 1379029 | 1/2004 | |
| EP | 1379029 A1 * | 1/2004 | ............. H04L 12/28 |
| EP | 1427245 | 6/2004 | |
| EP | 1427245 A2 * | 6/2004 | ............. H04Q 7/38 |
| EP | 1613017 | 1/2006 | |
| JP | 2000115161 A | 4/2000 | |
| JP | 2005236939 A | 9/2005 | |
| KR | 1020040004925 | 1/2004 | |
| RU | 2253948 | 6/2005 | |
| RU | 2004135075 | 9/2005 | |
| TW | I239184 | 9/2005 | |
| TW | I243553 | 11/2005 | |
| TW | 200605593 | 2/2006 | |
| WO | 0030391 | 5/2000 | |
| WO | WO0054521 A2 | 9/2000 | |
| WO | 0124562 | 4/2001 | |
| WO | 2004028041 | 4/2004 | |
| WO | 2007072814 A1 | 6/2007 | |

OTHER PUBLICATIONS

ETSI TS 133 102 v6.4.0: "Universal Mobile Telecommunications System," ETSI Standards, European Telecommunications Standards Institute, Sophia-Antipo, FR, 3GPP TS 33.102 version 6.4.0 Release 6, XP014032861, Sep. 2005.
International Search Report—PCT/US2007/061939, International Searching Authority-European Patent Office—Nov. 27, 2007.
Written Opinion—PCT/US2007/061939, International Searching Authority—European Patent Office—Nov. 27, 2007.
International Preliminary Report on Patentability—PCT/US2007/061939, International Bureau of WIPO—Geneva, Switzerland—Aug. 12, 2008.
Taiwanese Search report—096105045—TIPO—Sep. 25, 2010.
Weis S.A.. et al., "Security and Privacy Aspects of Low-Cost Radio Frequency Identification Systems", [online], Security in Pervasive Computing 2003, 2004, LNCS 2802, pp. 201-212, <URL:http://citeseerx.ist.psu.edu/viewdoc/summary"doi=10.1.1.1.8095>.

\* cited by examiner

OBSCURING TEMPORARY USER EQUIPMENT IDENTITIES

The present application claims priority to provisional U.S. Application Ser. No. 60/771,974, filed Feb. 10, 2006, entitled "OBSCURING TEMPORARY USER EQUIPMENT IDENTITIES," and provisional U.S. Application Ser. No. 60/786,463, filed Mar. 27, 2006 entitled "DOWNLINK DATA SCHEDULING WITH OPAQUE OF IDENTITIES IN E-UTRAN," both assigned to the assignee hereof and incorporated herein by reference.

BACKGROUND

I. Field

The present disclosure relates generally to communication, and more specifically to techniques for obscuring identities in wireless communication.

II. Background

Wireless communication networks are widely deployed to provide various communication serves such as voice, video, packet data, massaging, broadcast, etc. A wireless communication network may include many Node Bs (or base stations) that may communicate with many user equipments (UEs). The UEs may be assigned various identifiers or identities (IDs) used to uniquely identify these UEs for various purposes. In certain instances, the UE IDs may be sent over the air in the clear without any ciphering. This may make it possible for an eavesdropper or attacker to mount a linkability attack by monitoring a communication channel for messages and determining which messages are directed to the same UE over time. The linkability attack may be able to link messages to specific UEs but may not be able to determine the true identities of the UEs. The linkability attack may be used to track the locations of the UEs and may also be the basis of other more sever security attacks. For example, the attacker may be able to determine which UE ID is assigned to a particular UE by initiating a call to that UE and observing which UE IDs are used at approximately the same time.

SUMMARY

Techniques for concealing temporary IDs assigned to UEs by a wireless communication network are described herein. These techniques may be used for various types of messages addressed to specific UEs and sent in the clear without ciphering via common channels. These techniques may be used to improve security, e.g., to foil linkability attacks.

In an aspect, at a network entity (e.g., a Node B), a first ID assigned to a UE may be transformed to obtain a second ID for the UE. The first ID may be a Radio Network Temporary Identifier (RNTI) assigned to the UE in Universal Mobile Telecommunication System (UMTS) or some other type of ID in some other communication system. The first ID and possibly a salt value (which is a non-static value) may be transformed based on a hash function to obtain the second ID. An output message directed to the UE may be generated based on an input message, the second ID, and the salt value (if present). The input message may be a paging message, a scheduling message carrying scheduling information, a resource assignment message, etc. The output message may be sent via a common channel shared by the UE and other UEs.

In another aspect, at the UE, a message may be received via the common channel, and a salt value (if sent) may be obtained from the received message. The first ID and the salt value (if sent) may be transformed to obtain the second ID, which may be used to determine whether the received message is intended for the UE.

Various aspects and features of the disclosure are described in further detail below.

DETAILED DESCRIPTION

The techniques described herein may be used for various wireless communication networks such as Code Division Multiple Access (CDMA) networks, Time Division Multiple Access (TDMA) networks, Frequency Division Multiple Access (FDMA) networks, etc. The terms "networks" and "systems" are often used interchangeably. A CDMA network may implement a radio technology such as Universal Terrestrial Radio Access (UTRA), Evolved UTRA (E-UTRA), cdma2000, etc. UTRA and E-UTRA are part of UMTS. UTRA includes Wideband-CDMA (W-CDMA) and Low Chip Rate (LCR), cdma2000 covers IS-2000, IS-95 and IS-856 standards. A TDMA network may implement a radio technology such as Global System for Mobile Communication (GSM). An OFDMA network may implement a radio technology such as Long Term Evolution (LTE), IEEE 802.20, Flash-OFDM®, etc. UTRA, E-UTRA, UMTS, GSM and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for UMTS, and 3GPP terminology is used in much of the description below.

Figure 1:
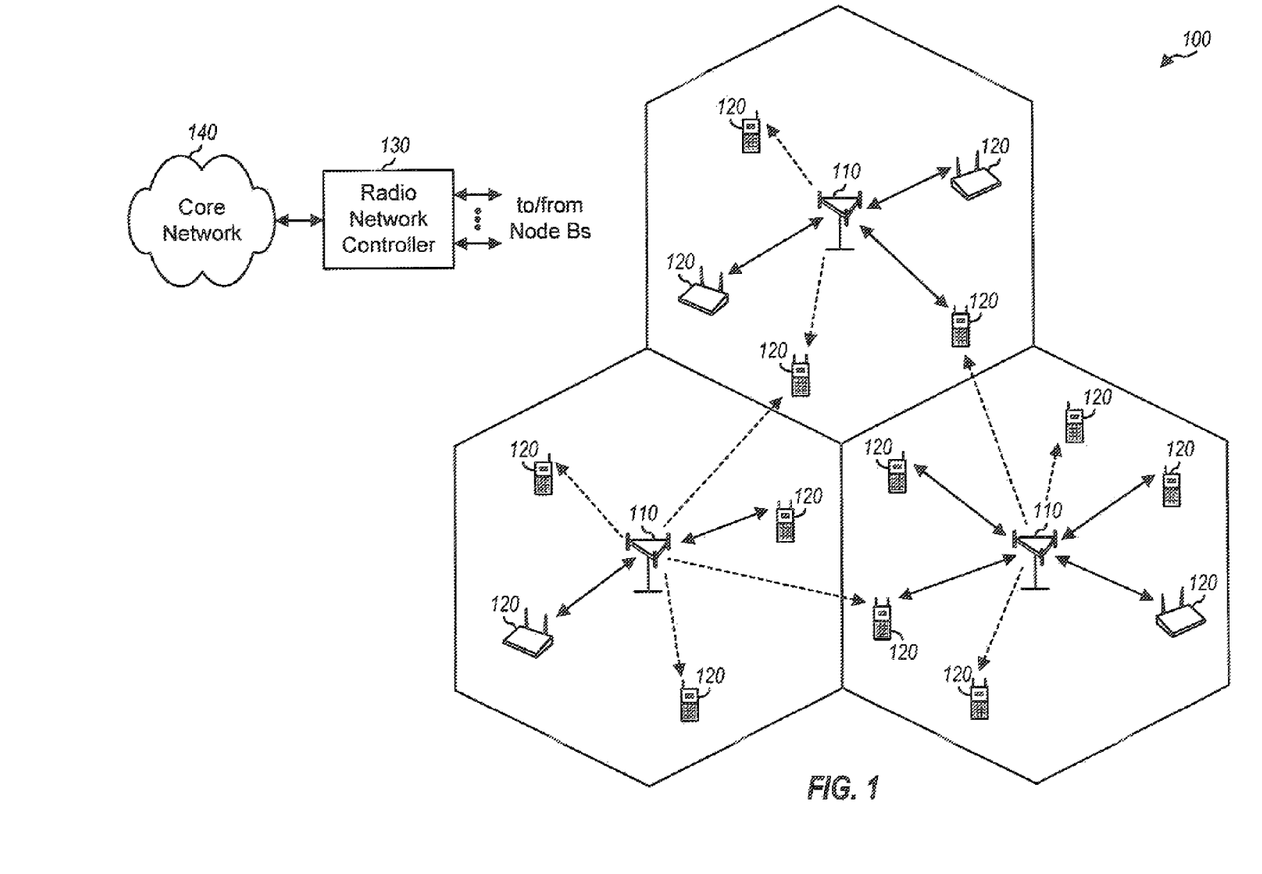
FIG. 1 shows a UMTS network.

FIG. 1 shows a UMTS network 100 that includes a Universal Terrestrial Radio Access Network (UTRAN) and a core network 140. The UTRAN includes multiple Node Bs 110 and a Radio Network Controller (RNC) 130. A Node B is generally a fixed station that communicates with the UEs and may also be referred to as an enhanced Node B, a base station, an access point, etc. Each Node B 110 provides communication coverage for a particular geographic area and supports communication for the UEs located within the coverage area. The term "cell" can refer to a Node B and/or its coverage area depending on the context in which the term is used. RNC 130 couples to Node Bs 110 and provides coordination and control for these Node Bs, RNC 130 also originates and terminates messages for certain protocols and applications. Core network 140 may include various network entities that support various functions such as packet routing, user registration, mobility management, etc.

UEs 120 may be dispersed throughout the UMTS network, and each UE may be stationary or mobile. A UE may also be referred to as a mobile station, a terminal, an access terminal, a subscriber unit, a station, etc. A UE may be a cellular phone, a personal digital assistant (PDA), a wireless device, a handheld device, a wireless modem, a laptop computer, etc. A UE may communicate with one or more Node Bs on the downlink and/or uplink at any given moment. The downlink (or forward link) refers to the communication link from the Node Bs to the UEs, and the uplink (or reverse link) refers to the communication link from the UEs to the Node Bs.

In UMTS, data and signaling for the UEs are processed as logical channels at a Radio Link Control (RLC) layer. The logical channels include a Dedicated Traffic Channel (DTCH), a Downlink Shared Channel (DSCH), a Dedicated Control Channel (DCCH), a Common Control Channel (CCCH), etc. The logical channels are mapped to transport channels at a Medium Access Control (MAC) layer. The transport channels carry data for various services such as voice, video, packet data, etc. The transport channels are mapped to physical channels at a physical layer. The physical channels are channelized with different channelization codes and are orthogonal to one another in the code domain.

A UE in UMTS may be assigned a variety of IDs used to identify the UE for various purposes. These UE IDs may have different context or scope (e.g., cell, paging area, etc.) and/or different life spans (e.g., temporary or permanent). For example, the UE may be assigned various RNTIs that may be used as temporary IDs. Table 1 lists some RNTIs that may be assigned to the UE and provides a short description of where each RNTI may be used. The C-RNTI and U-RNTI may be assigned to the UE by a serving RNC and may be scoped to an RRC connection within a particular cell. The C-RNTI may be used for messages sent on the DTCH and DSCH. The U-RNTI may be used for paging messages sent on a Paging Channel (PCH) and for messages sent on the DCCH. The DSCH-RNTI, H-RNTI and E-RNTI may be scoped to a particular cell and used for signaling messages sent on the DSCH, a High Speed Downlink Shared Channel (HS-DSCH), and an E-DCH Absolute Grant Channel (E-AGCH), respectively. These various RNTIs may be collectively referred to as "X-RNTIs" and may be used as temporary IDs in local context to address the UE for signaling messages sent by Radio Resource Control (RRC) and MAC protocols. The X-RNTIs may be assigned by different network entities within the UTRAN (or simply, the UTRAN). Each X-RNTI may be used for signaling messages exchanged between the assigning network entity and the recipient UE.

TABLE 1

| Symbol | Name | Length | Use |
| --- | --- | --- | --- |
| C-RNTI | Cell RNTI | 16 bits | Used for messages sent on DTCH and DSCH |
| U-RNTI | UTRAN-RNTI | 32 bits | Used for paging messages sent on PCH and for messages sent on DCCH |
| DSCH-RNTI | DSCH Radio Network Identifier | 16 bits | Used for signaling messages sent on DSCH |
| H-RNTI | HS-DSCH Radio Network Identifier | 16 bits | Used for signaling messages sent on HS-DSCH |
| E-RNTI | E-DCH Radio Network Identifier | 16 bits | Used for signaling messages sent on E-AGCH |

The X-RNTIs may be assigned to a UE at various times by the UTRAN. The assignments may take place via unciphered signaling due to the absence of a pre-existing security relationship between the UTRAN and UE at the time of assignment. However, in the assignment of an X-RNTI, the UTRAN typically addresses the UE by a Temporary Mobile Subscriber Identity (TMSI) or a Packet TMSI (P-TMSI), which is assigned to the UE in ciphered signaling at a Non Access Stratum (NAS) layer. Thus, an attacker may observe what X-RNTI was assigned by a downlink message but, in the absence of additional knowledge of the TMSI or P-TMSI, would not be able to determine which UE was receiving the assignment.

Once an X-RNTI is assigned to a UE, the X-RNTI may be sent in the clear without ciphering in downlink and/or uplink signaling. For example, messages for specific UEs may be sent on the CCCH and addressed to the recipient UEs by their U-RNTIs. These messages may be sent on signaling radio bearer 0 (SRB0) and would be unciphered since SRB0 may carry messages for UEs that do not already have a security relationship with the UTRAN. For messages sent unciphered on a common channel, an attacker may be able to determine that a message was directed toward a particular X-RNTI or UE. While the attacker may not know the identity of this UE outside of the radio context, the available information may make it possible to aggregate information about messages directed to the same UE in a so-called "linkability attack". The attacker may monitor unciphered scheduling information sent on a control channel and may be able to determine data transmissions addressed the same UE. The attacker may then potentially track individual UEs' mobility between cells during a data session. In any case, sending messages in the clear on a common channel may result in a security vulnerability that may lead to more serious security threats.

Techniques for reducing security vulnerability due to transmission of messages in the clear on a common channel are described herein. These techniques may be used for various signaling messages sent at various layers. The techniques may also be used for the downlink and uplink. For clarity, the techniques are described below for transmission of scheduling information and paging messages on the downlink in UMTS.

3GPP Release 5 and later supports HSDPA, which is a set of channels and procedures that enable high-speed packet data transmission on the downlink. For HSDPA, a Node B sends data on the HS-DSCH, which is a downlink transport channel that is shared by all UEs in both time and code. The HS-DSCH may carry data for one or more UEs in each transmission time interval (TTI). For HSDPA, a 10 millisecond (ms) frame is partitioned into five 2-ms subframes, each subframe covers three time slots, and each time slot has a duration of 0.667 ms. For HSDPA, a TTI is equal to one subframe and is the smallest unit of time in which a UE may be scheduled and served. The sharing of the HS-DSCH is dynamic and may change from TTI to TTI. Data for the HS-DSCH is sent on a High Speed Physical Downlink Shared Channel (HS-PDSCH), and signaling for the HS-PDSCH is sent on a Shared Control Channel for HS-DSCH (HS-SCCH).

For HSDPA, a Node B may use up to fifteen 16-chip channelization codes with spreading factor of 16 for the HS-PDSCH. The Node B may also use any number of 128-chip channelization codes with spreading factor of 128 for the HS-SCCH. The number of 16-chip channelization codes for the HS-PDSCH and the number of 128-chip channelization codes for the HS-SCCH are configurable. The channelization codes for the HS-PDSCH and HS-SCCH are orthogonal variable spreading factor (OVSF) codes that may be generated in a structured manner. The spreading factor (SF) is the length of a channelization code. A symbol is spread with a channelization code of length SF to generate SF chips for the symbol.

In the following description, HSDPA is considered as having (a) up to fifteen HS-PDSCHs, with each HS-PDSCH corresponding to a different 16-chip channelization code, and (b) any number of HS-SCCHs, with each HS-SCCH corresponding to a different 128-chip channelization code. A UE may be assigned up to four HS-SCCHs at call setup and may monitor the assigned HS-SCCHs during the call. The UE may be assigned up to fifteen HS-PDSCHs in a given TTI. The HS-PDSCHs may be dynamically assigned and conveyed to the UE via signaling sent on one of the HS-SCCHs assigned to the UE.

Figure 2:
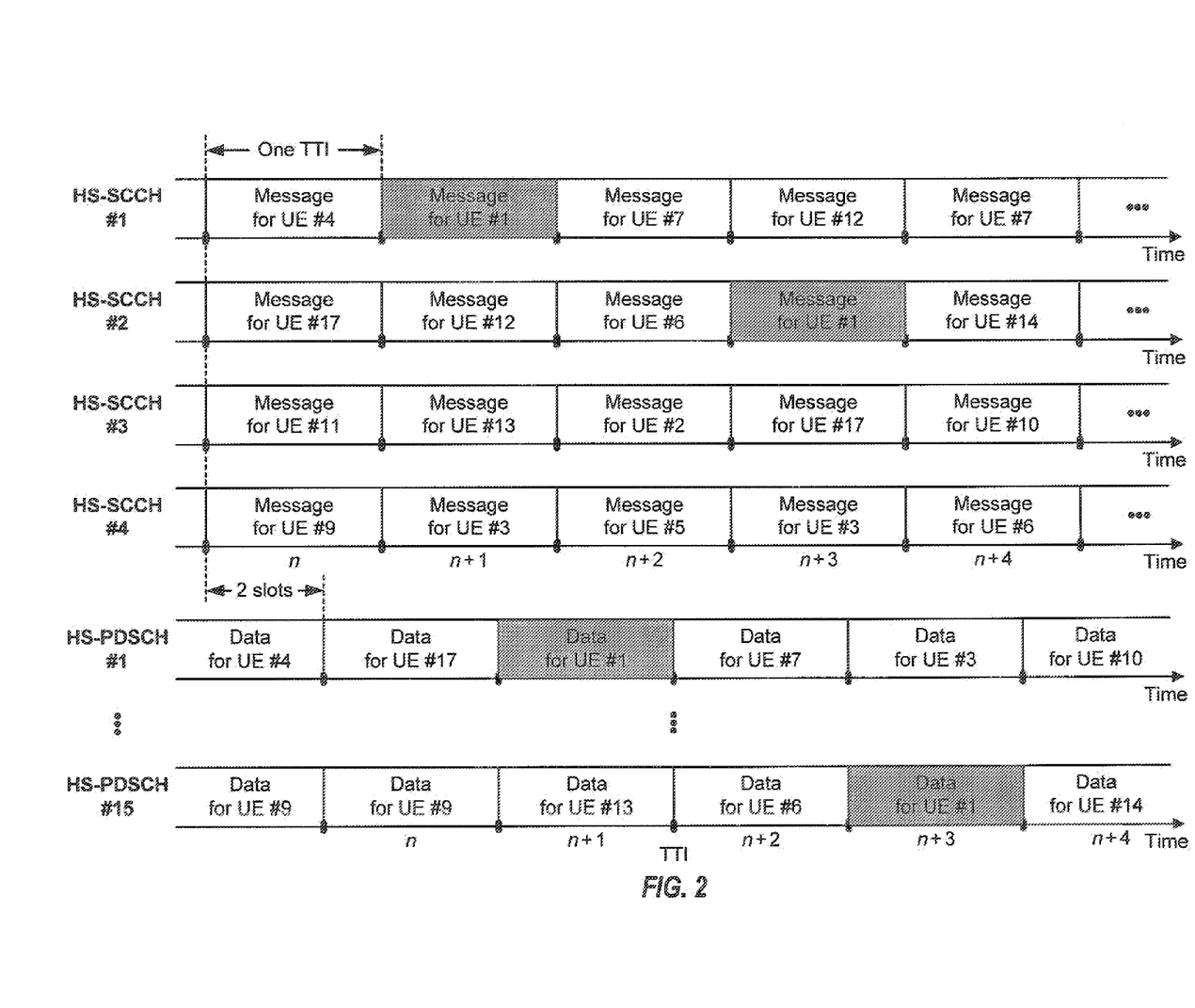
FIG. 2 shows transmissions for High-Speed Downlink Packet Access (HSDPA).

FIG. 2 shows example transmissions on the HS-SCCHs and HS-PDSCHs for HSDPA. A Node B may serve one or more UEs in each TTI. The Node B sends a signaling message for each scheduled UE on the HS-SCCHs and sends data to the UE on the HS-PDSCHs two slots later. The signaling messages sent on the HS-SCCHs are addressed to specific UEs based on the H-RNTIs assigned to these UEs. Each UE that might receive data on the HS-PDSCHs processes its assigned HS-SCCHs in each TTI to determine whether a signaling message has been sent for that UE. Each UE may match the signaling messages received on the HS-PDSCHs with its H-RNTI to determine whether any signaling message is intended for the UE. Each UE that is scheduled in a given TTI may process the HS-PDSCHs to recover the data sent to that UE.

In the example shown in FIG. 2, a UE of interest (UE #1) monitors four HS-SCCHs #1 through #4 assigned to the UE. UE #1 is not scheduled in TTI n, and no signaling messages are sent to UE #1 on any HS-PDSCHs. UE #1 is scheduled in TTI n+1, and a signaling message is sent to the UE on HS-SCCH #1. The signaling message may convey various parameters for the transmission sent in this TTI. UE #1 is not scheduled in TTI n+2, is scheduled in TTI n+3 and receives a signaling message on HS-SCCH #2, and is not scheduled in TTI n+4.

Other RNTIs may be used for other signaling messages sent to specific UEs on common channels. For example, assignment messages sent on the E-AGCH are addressed to specific UEs based on the E-RNTIs assigned to these UEs. Paging messages are addressed to specific UEs based on the U-RNTIs assigned to these UEs.

In general, an X-RNTI may be sent in a signaling message transmitted on the downlink and may be used by each UE to match against its now X-RNTI to determine whether the signaling message is intended for that UE, i.e., to ascertain "is this message for me!" All of the information in the X-RNTI may not be necessary for this matching process since the possible space of X-RNTI values may not be full. The X-RNTI may be 16 bits (or 32 bits) long and may provide identities for many more UEs than a Node B may be able to address at any one time. For example, the Node B may have assigned only 1024 identities in the range of 0 to 1023. In this case, only 10 least significant bits (LSBs) of the X-RNTI may be used to uniquely identify a given UE. The Node B may then send random values for the higher bits and allow each UE to recognize messages directed to that UE by looking at only the lower bits, which contain the "real" portion of the identity. Sending random values for the higher bits may result in many different X-RNTI values being sent for any given UE, which may mitigate linkability attack. However, this "truncation" scheme is essentially transparent. An attacker who is aware of the scheme can trivially penetrate it and examine the lower bits to determine which messages are addressed to the same UEs.

In an aspect, an X-RNTI may be transformed based on a function, and a transformed RNTI (instead of the original X-RNTI) may be sent in a signaling message. A UE that already knows the X-RNTI may be able to determine whether the signaling message is intended for the UE based on the transformed RNTI. However, an attacker without prior knowledge of the X-RNTI may be unable to determine the original X-RNTI based on the transformed RNTI sent in the message. The transformation may be performed in various manners.

Figure 3A:
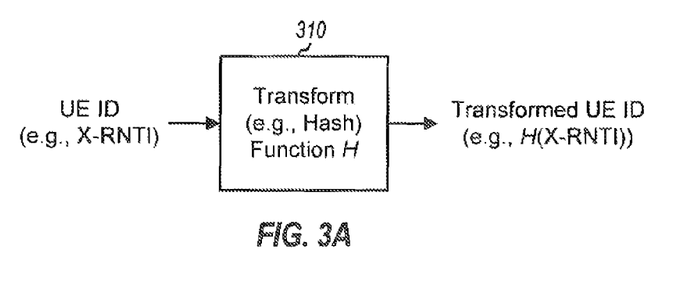
FIGS. 3A and 3B show two designs for transforming an RNTI.

FIG. 3A shows a design for transforming an X-RNTI. A unit 310 receives the X-RNTI, transforms the X-RNTI based on a transform function H, and provides a transformed RNTI that is denoted as H(X-RNTI). The transform function may be a irreversible function that makes it difficult to determine the original X-RNTI from the transformed RNTI. For example, the transform function may be a cryptographic/secure hash function that maps a message (e.g., the X-RNTI) to a digest (e.g., the transformed RNTI) and has cryptographic properties so that (i) the function between the message and its digest is irreversible and (ii) the likelihood of two messages mapping to the same digest is very small. The output of the hash function may be referred to as a digest, a signature, a hashed value, etc.

The transformed RNTI may be sent in a signaling message and may allow for matching of the message by the UEs. Each UE may apply the same transform function to its X-RNTI to obtain a transformed RNTI. Each UE may then match the transformed RNTI fin a received message with the locally generated transformed RNTI to determine whether the message is intended for that UE.

The transformed RNTI may prevent an attacker from inferring the original X-RNTI. However, if the same transformed RNTI is included in each signaling message sent to a given UE, then the attacker may perform a correlation attack. To prevent this, the transformed RNTI may be changed with each message.

Figure 3B:
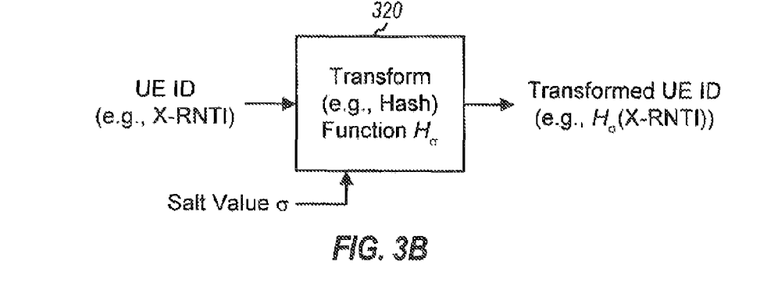

FIG. 3B shows a design for transforming an X-RNTI to obtain different transformed RNTIs. A unit 320 receives the X-RNTI and a salt value σ, transforms the X-RNTI and the salt value based on a transform function $H_\sigma$, and provides a transformed RNTI that is denoted as $H_\sigma$(X-RNTI). The transform function may be a irreversible function, a cryptographic hash function, etc. A salt value is a non-static value that may be selected in any manner. Different salt values may be used for different signaling messages so that a single X-RNTI may give rise to different transformed RNTIs for different messages.

A transformed RNTI and a salt value σ may be sent in a signaling message and may allow for matching of the message by the UEs. The salt value σ may be sent in the clear along with the transformed RNTI. The salt value σ and/or the transformed RNTI may also be embedded in the signaling message. In any case, each UE may match its X-RNTI against the transformed RNTI in the signaling message. Each UE may apply the transform function $H_\sigma$ to its X-RNTI and the salt value σ extracted from the message and may then compare the locally generated transformed RNTI to the received transformed RNTI in the signaling message.

Figure 4A:
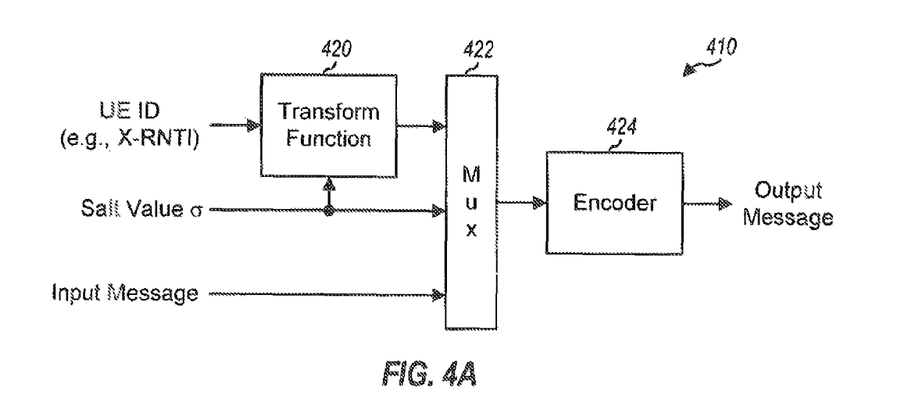
FIG. 4A shows a processor that sends a transformed RNTI in the clear.

FIG. 4A shows a block diagram of a design of a message processor 410 that sends a transformed RNTI in the clear in a signaling message. Message processor 410 receives an input message and an X-RNTI for a recipient UE and generates an output message directed to the UE.

Within message processor 410, a unit 420 receives an X-RNTI and possibly a salt value σ, applies a transform function on the X-RNTI and possibly the salt value σ, and provides a transformed RNTI. A multiplexer (Mux) 422 multiplexes the transformed RNTI, the salt value σ (if present), and an input message. An encoder 424 encodes the output of multiplexer 422 and provides an output message. Message processor 410 may be used for paging messages sent on the PCH. In this case, the UE ID or X-RNTI in FIG. 4A may correspond to the U-RNTI.

Figure 4B:
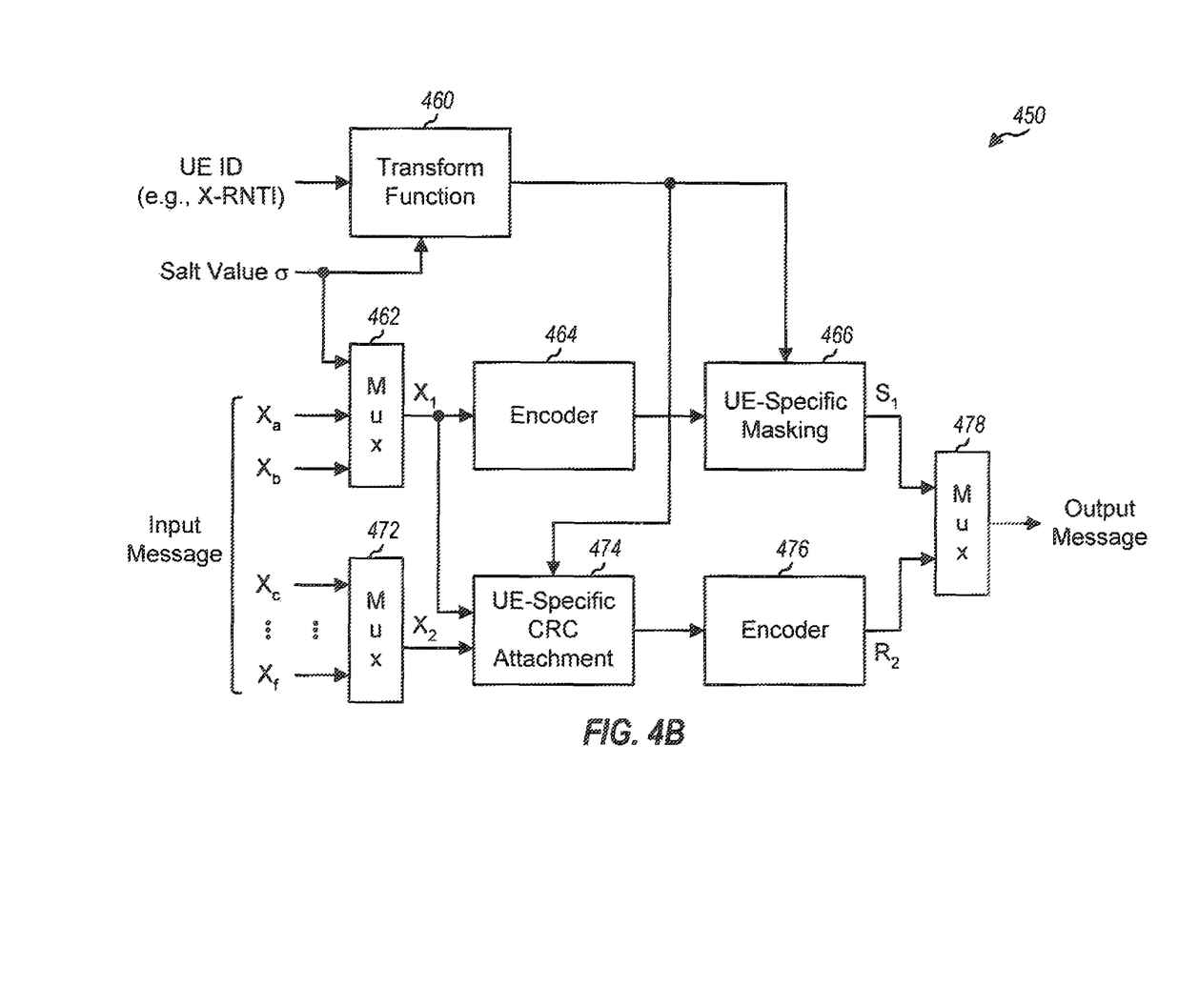
FIG. 4B shows a processor that embeds a transformed RNTI in a message.

FIG. 4B shows a block diagram of a design of a message processor 450 that embeds a transformed RNTI in a signaling message. Message processor 450 receives an input message and an X-RNTI for a recipient UE and generates an output message directed to the UE. The input message may comprise various pieces of information.

Within message processor 450, a unit 460 receives an X-RNTI and possibly a salt value σ, applies a transform function on the X-RNTI and possibly the salt value σ, and provides a transformed RNTI. A multiplexer 462 receives and multiplexes signaling information $X_a$ and $X_b$ and the salt value σ (if present) and provides multiplexed information $X_1$. A encoder 464 encodes the multiplexed information $X_1$ and provides coded information. A unit 466 masks the coded information based on the transformed RNTI and provides masked information $S_1$. A multiplexer 472 receives and multiplexes signaling information $X_c$ through $X_f$ and provides multiplexed information $X_2$. A unit 474 generates a cyclic redundancy check (CRC) based on information $X_1$ and $X_2$, then masks the CRC with the transformed RNTI to obtain a UE-specific CRC, and appends the UE-specific CRC to information $X_2$. An encoder 476 encodes the output of unit 474 and provides coded information $R_2$. A multiplexer 478 receives and multiplexes the masked information $S_1$ and the coded information $R_2$ and provides the multiplexed information $S_1$ and $R_2$ as an output message.

Message processor 450 may be used for signaling messages sent on the HS-SCCHs. In this case, $X_a$ may comprise channelization code set information, $X_b$ may comprise modulation scheme information, $X_c$ may comprise transport block size information, $X_d$ may comprise HARQ process information, $X_e$ may comprise redundancy and constellation version information, $X_f$ may comprise new data indicator information, and the X-RNTI may correspond to the H-RNTI. Information $S_1$ may be sent in the first slot of a TTI, and information $R_2$ may be sent in the last two slots of the TTI. In this case, the salt value σ may be multiplexed with information $X_a$ and $X_b$ sent in the first slot of the TTI, as shown in FIG. 4B. This may allow for early detection of the signaling message by the UEs, without having to wait for the entire message to be received.

FIG. 4A shows a design in which a transformed RNTI is sent in the clear in a signaling message. The transformed RNTI may also be sent in the clear in other manners. FIG. 4B shows a design in which a transformed RNTI is embedded in a signaling message. The embedding of the transformed RNTI may also be achieved in other manners. For example, a signaling message sent on the E-AGCH may include a UE-specific CRC that may be generated based on a transformed E-RNTI. In general, a transformed RNTI may be sent in various manners (e.g., in the clear or embedded) in a signaling message such that a recipient UE can identify the message as being directed to that UE.

As shown in FIG. 2, a UE may receive multiple (e.g., up to four) signaling messages in each TTI and may check each received message to determine whether the message is intended for the UE. The transform function should be computationally simple so that the UE can apply the transform function for each received message without adversely impacting performance. Ideally, the message matching with the transformed RNTI should require only few additional instructions beyond that is normally done to match the X-RNTI.

For the design shown in FIG. 3B, a UE may store a look-up table of transformed RNTIs obtained by hashing its X-RNTI with all possible salt values. The transformed RNTIs may thus be pre-computed once and stored for later use, instead of being computed whenever signaling messages are received. For each received message, the UE may extract the salt value from the received message, retrieve the transformed RNTI for that salt value from the look-up table, and check the received message with the retrieved transformed RNTI.

The UTRAN may assign a new X-RNTI to a UE via ciphered signaling at the start of a call and possibly during the call. Transformed versions of the new X-RNTI may be sent over the air freely since only the UE has the unhashed version. An attacker may not have sufficient information to perform matching of signaling messages sent with the transformed RNTIs. The attacker may monitor all signaling messages in a cell over a period of time and correlate these signaling messages by maintaining a database of all possible X-RNTIs and checking each received message against all of the X-RNTIs. This type of determined eavesdropping may be combated by periodically assigning new X-RNTIs to the UEs.

Various transform functions may be used to generate transformed RNTIs. In general, a transform function should have the following qualities:

Easy and quick computation (or amenable to a look-up table at the UE);
Transformed RNTI and salt value should be small;
Difficult or impossible to reverse; and
Easy for the UTRAN to guard against collisions.

A tradeoff may be made among the qualities listed above for a given application. Different transform functions with different characteristics may be used for different applications. For example, signaling at Layer 2 may favor high bit-efficiency and quick decoding and may be able to accept a lower level of security as a result. Signaling at Layer 3 may favor stronger security at the expense of greater overhead.

The importance of a highly irreversible function may depend on the level of determination assumed on the part of an attacker. A transform function may simply mask out a few bits in varying positions from the X-RNTI and may use the salt value to select the masked bits. This transform function may be susceptible to a brute-force attack in which the attacker collects signaling messages, tries all possible values for the deleted bits, and watches to see which ones of the resulting values are repeated. The attacker may presume that the repeated values are the real X-RNTIs of various UEs and may store these values for testing against future signaling messages. However, this may represent a significantly more laborious attack than the casual eavesdropping normally associated with linkability attacks.

Even if a transform function is somewhat weak cryptographically, the UTRAN may assign new X-RNTIs via ciphered signaling. In this case, an attacker may not automatically have a pool of known X-RNTIs to test received messages against. In light of the ability to assign new X-RNTIs, the cryptographic strength of the transform function may be considered less important than simple computation and over-the-air bit conservation.

A transform function may be defined based on various designs. For example, a transform function may incorporate design principles used in cryptographic/secure hash functions such as SHA-1 (Secure Hash Algorithm), SHA-2 (which includes SHA-224, SHA-256, SHA-384 and SHA-512, MD-4 (Message Digest), MD-5, or other secure hash algorithms known in the art. In one design, a single transform function is used and known a priori by both the UTRAN and the UEs. In another design, a set of transform functions is supported, and one transform function may be selected from the set, e.g., at the start of a call, and conveyed to a UE.

The length of the sale value σ may be selected based on a tradeoff between overhead and security. A longer salt value may result in more transformed RNTIs for a given X-RNTI, which may improve security at the expense of larger overhead and possibly greater collision probability. The converse may be true for a shorter salt value.

In one design, a transformed RNTI has the same or approximately the same length as the original X-RNTI. For this design, the salt value σ may be sent using additional bits. In another design, the transformed RNTI and the salt value σ have the same or approximately the same length as the original X-RNTI in order to maintain the same or approximately the same overhead. For this design, some bits may be "reclaimed" by making the transformed RNTI shorter than the original X-RNTI. For example, the X-RNTI may be 16 bits, the transformed RNTI may be 10 bits, and the salt value may 6 bits. The X-RNTI, transformed RNTI, and salt value may also have other lengths. The transform function may be designed to achieve the desired cryptographic properties with the shorter transformed RNTI.

A collision occurs when two X-RNTIs for two UEs are transformed to the same transformed RNTI, e.g., $H_\sigma(x)=H_\sigma(y)$, where x and y are the two X-RNTIs. The two UEs may have no way to resolve the collision between their transformed RNTIs. The transformed RNTI may be used to send scheduling information to one of the two UEs, e.g., as shown in FIG. 2. The recipient UE may properly detect the scheduling information as being for that UE and may decode the data sent to the UE. The non-recipient UE may falsely detect the scheduling information, decode the data destined for the recipient UE, and obtain nonsense result after decrypting (assuming that the data sent on the HS-DSCH was encrypted). In this case, collisions may or may not adversely impact performance, depending on the behavior of the application.

In general, impact due to collisions of X-RNTIs may be dependent on the type of signaling being sent with these X-RNTIs. The UTRAN may attempt to prevent collisions in order to avoid possible adverse effects.

In one design for avoiding collisions, the UTRAN selects X-RNTIs and salt values known to have no collisions. The UTRAN may maintain a set of all X-RNTIs assigned or assignable to the UEs. For each possible salt value σ, the UTRAN may generate a set of transformed RNTIs based on the set of X-RNTIs and that salt value. The UTRAN may scan the transformed set for duplicates and may reject this salt value if duplicates are detected. In general, a salt value that causes a collision for certain X-RNTIs may still be used for other X-RNTIs. However, in order to simplify implementation, the UTRAN may maintain a list of salt values that result in no duplicates over the entire set of X-RNTIs. The sale values in this is may be selected for use. Collisions may also be avoided in other manners.

Figure 5:
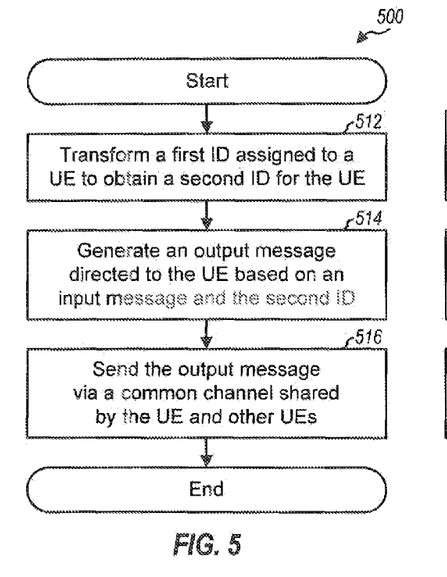
FIG. 5 shows a process for sending signaling messages to a UE.

FIG. 5 shows a process 500 performed by a network entity in a wireless communication network to send signaling messages to the UEs. The network entity may be a Node B, an RNC, etc., depending on the signaling messages being sent.

A first ID assigned to a UE may be transformed to obtain a second ID for the UE (block 512). The first ID may be an RNTI assigned to the UE in UMTS or some other type of ID in some other communication system. The first ID may be transformed based on an irreversible function, a hash function, or some other function to obtain the second ID. An output message directed to the UE may be generated based on an input message and the second ID (block 514). The input message may be a paging message, a scheduling message carrying scheduling information, a resource assignment message, etc. The output message may be sent via a common channel shared by the UE and other UEs (block 516).

In one design, the first ID and a salt value are hashed to obtain the second ID. The salt value may be sent in the clear in the output message. The salt value may be changed each time the first ID is transformed and may be selected to avoid collisions among all first IDs assigned to the UEs. The first ID may have a length that may be equal to the combined length of the second ID and the salt value.

In one design, the output message may include the input message and the second ID in the clear, e.g., as shown in FIG. 4A. In another design, the second ID may be embedded in the output message, e.g., as shown in FIG. 4B. For example, all or a portion of the input message may be masked with the second ID to generate the output message. Alternatively, a UE-specific CRC may be generated based on the input message and the second ID, and the output message may be generated based on the input message and the UE-specific CRC.

Figure 6:
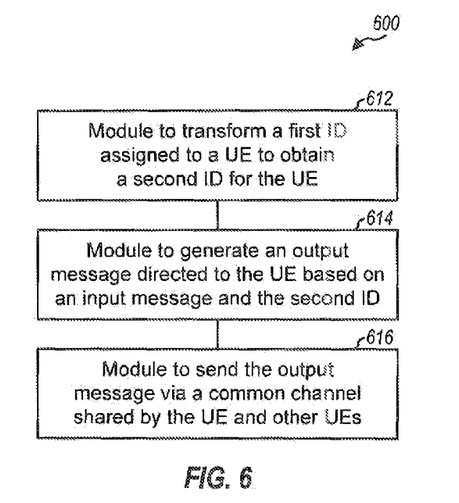
FIG. 6 shows an apparatus for sending signaling messages to a UE.

FIG. 6 shows an apparatus 600 for sending signaling messages to the UEs. Apparatus 600 includes means for transforming a first ID assigned to a UE to obtain a second ID for the UE (module 612), means for generating an output message directed to the UE based on an input message and the second ID (module 614), and means for sending the output message via a common channel shared by the UE and other UEs (module 616). Modules 612 to 616 may comprise processors, electronics devices, hardware devices, electronic components, logical circuits, memories, etc., or any combination thereof.

Figure 7:
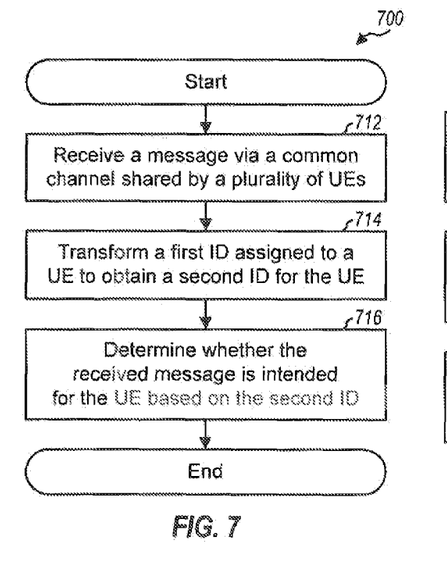
FIG. 7 shows a process for receiving signaling messages at a UE.

FIG. 7 shows a process 700 performed by a UE to receive signaling messages from a wireless communication network. A message may be received via a common channel shared by a plurality of UEs (block 712). A first ID assigned to the UE may be transformed to obtain a second ID for the UE (block 714). The transformation may be achieved with a look-up table, hardware, software, firmware, etc. in one design, a salt value may be obtained from the received message, and the first ID and the salt value may be hashed to obtain the second ID. Whether the received message is intended for the UE may be determined based on the second ID (block 716). In one design of block 716, a third ID may be obtained from the received message and compared to the second ID to determine whether the received message is intended for the UE. In another design of block 716, a CRC may be generated based on the received message and the second ID, a UE-specific CRC may be obtained from the received message, and the generated CRC may be compared to the UE-specific CRC to determine whether the received message is intended for the UE. The received message may be a paging message, a scheduling message, a resource assignment message, etc. If the received message is a scheduling message, then scheduling information may be obtained from the received message and used to process a data transmission sent to the UE.

Figure 8:
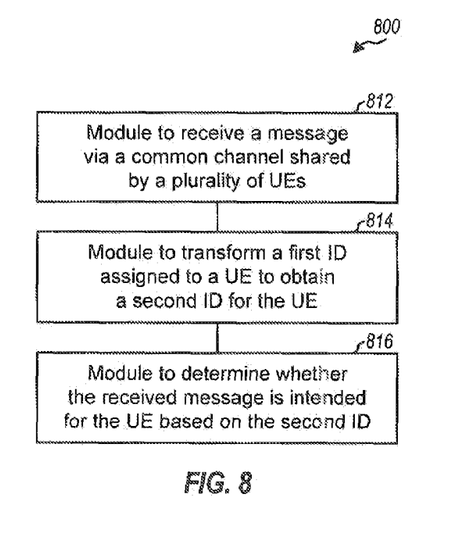
FIG. 8 shows an apparatus for receiving signaling messages at a UE.

FIG. 8 shows an apparatus 800 for receiving signaling messages. Apparatus 800 includes means for receiving a message via a common channel shared by a plurality of UEs (module 812), means for transforming a first ID assigned to a UE to obtain a second ID for the UE (module 814), and means for determining whether the received message is intended for the UE based on the second ID (module 816). Modules 812 to 816 may comprise processors, electronics devices, hardware devices, electronics components, logical circuits, memories, etc., or any combination thereof.

Figure 9:
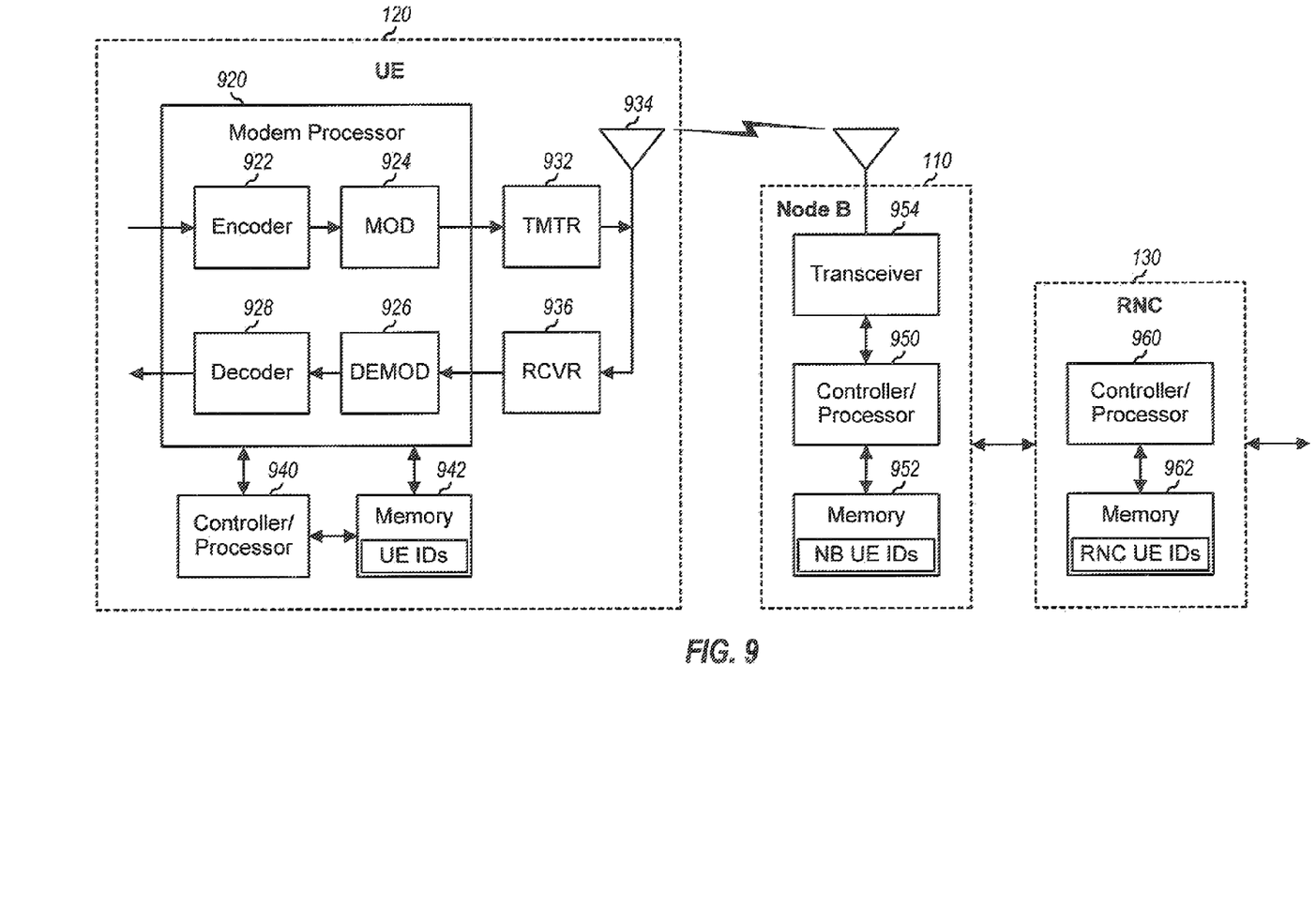
FIG. 9 shows a block diagram of a UE, a Node B, and an RNC.

FIG. 9 shows a block diagram of a design of UE 120, Node B 110, and RNC 130 in FIG. 1. On the uplink, data and signaling to be sent by UE 120 are processed (e.g., formatted, encoded, and interleaved) by an encoder 922 and further processed (e.g., modulated, channelized, and scrambled) by a modulator (MOD) 924 to generate output chips. A transmitter (TMTR) 932 then conditions (e.g., converts to analog, filters, amplifies, and frequency upconverts) the output chips and generates an uplink signal, which is transmitted via an antenna 914. On the downlink, antenna 934 receives a downlink signal transmitted by Node B 110. A receiver (RCVR) 936 conditions (e.g., filters, amplifies, frequency downconverts, and digitizes) the received signal from antenna 934 and provides samples. A demodulator (DEMOD) 926 processes (e.g., descrambles, channelizes, and demodulates) the samples and provides symbol estimates. A decoder 928 further processes (e.g., deinterleaves and decodes) the symbol estimates and provides decoded data. Encoder 922, modulator 924, demodulator 926, and decoder 928 may be implemented by a modem processor 920. These units may perform processing in accordance with the radio technology (e.g., UMTS) implemented by the wireless communication network.

A controller/processor 940 directs the operation at UE 120. Controller/processor 940 may perform process 700 in FIG. 7 and/or other processes for the techniques described herein. A memory 942 stores program codes and data for UE 120 and may also store temporary IDs assigned to UE 120, or UE IDs.

FIG. 9 also shows a design of Node B 110 and RNC 130. Node B 110 includes a controller/processor 950 that performs various functions for communication with the UEs, a memory 952 that stores program codes and data for Node B 110, and a transceiver 954 that supports radio communication with the UEs. Controller/processor 950 may perform process 500 in FIG. 5 and/or other processes for the techniques described herein, Memory 952 may store temporary IDs assigned to the UEs by Node B 110, or NB UE IDs. RNC 130 includes a controller/processor 960 that performs various functions to support communication for the UEs and a memory 962 that stores program codes and data for RNC 130. Controller/processor 960 may perform process 500 in FIG. 5 and/or other processes for the techniques described herein. Memory 962 may store temporary IDs assigned to the UEs served by RNC 130, or RNC UE IDs.

The techniques described herein may be used for signaling messages sent on the downlink and well as the uplink. The techniques may also be used for messages sent via a control plane as well as a user plane. A control plane is a mechanism for carrying signaling for higher-layer applications and is typically implemented with network-specific protocols, interfaces, and signaling messages. A user plane is a mechanism for carrying signaling for higher-layer applications and is typically implemented with open protocols such as User Datagram Protocol (UDP), Transmission Control Protocol (TCP), and Internet Protocol (IP). Messages may be carried as part of signaling in a control plane and as part of data (from a network perspective) in a user plane.

The techniques described herein may be implemented by various means. For example, these techniques may be implemented in hardware, firmware, software, or a combination thereof. For a hardware implementation, the processing units used to perform the techniques at a given entity (e.g., a UE, a Node B, an RNC, etc.) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software codes may be stored in a memory (e.g., memory 942, 952 or 962 in FIG. 9) and executed by a processor (e.g., processor 940, 950 or 960). The memory may be implemented within the processor or external to the processor.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
a processor configured to transform a first identifier (ID) assigned to a user equipment (UE) to obtain a second ID for the UE using the first ID and a salt value, wherein:
 the processor is further configured to obtain the second ID by hashing the first ID and the salt value,
 the first ID and the salt value are selected from values that are known to have no collisions among the UE and other UEs,
 the processor is further configured to determine that an input message is directed to the UE, wherein the determination includes:
 obtaining a third ID from the input message, and
 comparing the second ID to the third ID to determine whether the input message is directed for the UE;
 the processor is further configured to generate an output message directed to the UE based on the input message, the second ID and the salt value, and to send the output message via a common channel shared by the UE and the other UEs, wherein the output message, when received by the UE, allows the UE to obtain the second ID and to compare the second ID with one or more entries of a look-up table stored at the UE, the look-up table including one or more additional second IDs obtained by hashing one or more additional first IDs with one or more additional salt values, and
 the processor is further configured to change the salt value each time the first ID is transformed for the UE; and
a memory coupled to the processor.

2. The apparatus of claim 1, wherein the processor is configured to transform the first ID based on an irreversible function to obtain the second ID.

3. The apparatus of claim 1, wherein the first ID has a length equal to a combined length of the second ID and the salt value.

4. The apparatus of claim 1, wherein the processor is configured to generate the output message to include the input message and the second ID in the clear.

5. The apparatus of claim 1, wherein the processor is configured to mask at least a portion of the input message with the second ID to generate the output message.

6. The apparatus of claim 1, wherein the processor is configured to generate a UE-specific cyclic redundancy check (CRC) based on the input message and the second ID, and to generate the output message based on the input message and the UE-specific CRC.

7. The apparatus of claim 1, wherein the input message is a paging message, a scheduling message, or a resource assignment message.

8. The apparatus of claim 1, wherein the first ID is a Radio Network Temporary Identifier (RNTI) assigned to the UE in Universal Mobile Telecommunication System (UMTS).

9. A method comprising:
transforming a first identifier (ID) assigned to a user equipment (UE) to obtain a second ID for the UE using the first ID and a salt value, wherein the transforming comprises hashing the first ID and the salt value to obtain the second ID, and wherein the first ID and the salt value are selected from values that are known to have no collisions among the UE and other UEs;
determining that an output message is directed to the UE, wherein the determination includes:
obtaining a third ID from the input message, and
comparing the second ID to the third ID to determine whether the input message is directed for the UE;
generating an output message directed to the UE based on the input message, the second ID and the salt value, wherein the output message, when received by the UE, allows the UE to obtain the second ID and to compare the second ID with one or more entries of a look-up table stored at the UE, the look-up table including one or more additional second IDs obtained by hashing one or more additional first IDs with one or more additional salt values;
changing the salt value each time the first ID is transformed for the UE; and
sending the output message via a common channel shared by the UE and the other UEs.

10. The method of claim 9, wherein the generating the output message comprises generating the output message to include the input message and the second ID in the clear.

11. The method of claim 9, wherein the generating the output message comprises generating a UE-specific cyclic redundancy check (CRC) based on the input message and the second ID, and generating the output message based on the input message and the UE-specific CRC.

12. An apparatus comprising:
means for transforming a first identifier (ID) assigned to a user equipment (UE) to obtain a second ID for the UE using the first ID and a salt value, wherein the means for transforming the first ID comprises means for hashing the first ID and the salt value to obtain the second ID, and wherein the first ID and the salt value are selected from values that are known to have no collisions among the UE and other UEs;
means for determining that an input message is directed to the UE, wherein the means for determining comprise:
means for obtaining a third ID from the input message, and
means for comparing the second ID to the third ID to determine whether the input message is directed for the UE;
means for generating an output message directed to the UE based on the input message, and the second ID and including an indication of the salt value, wherein the output message, when received by the UE, allows the UE to obtain the second ID and to compare the second ID with one or more entries of a look-up table stored at the UE, the look-up table including one or more additional second IDs obtained by hashing one or more additional first IDs with one or more additional salt values;
means for changing the salt value each time the first ID is transformed for the UE; and
means for sending the output message via a common channel shared by the UE and the other UEs.

13. The apparatus of claim 12, wherein the means for generating the output message comprises means for generating the output message to include the input message and the second ID in the clear.

14. The apparatus of claim 12, wherein the means for generating the output message comprises means for generating a UE-specific cyclic redundancy check (CRC) based on the input message and the second ID, and means for generating the output message based on the input message and the UE-specific CRC.

15. A non-transitory computer-readable medium including computer-executable instructions stored thereon, comprising:
a first computer-executable instruction set for transforming a first identifier (ID) assigned to a user equipment (UE) to obtain a second ID for the UE using the first ID and a salt value, wherein:
the instruction set for transforming further comprises instructions for transforming the first ID by hashing the first ID and the salt value to obtain the second ID,
the first ID and the salt value are selected from values that are known to have no collisions among the UE and other UEs,
the instructions set for determining that an input message is directed to the UE, wherein the determination includes:
obtaining a third ID from the input message, and
comparing the second ID to the third ID to determine whether the input message is directed for the UE;
the instruction set for transforming further comprises instructions for changing the salt value each time the first ID is transformed for the UE;
a second computer-executable instruction set for generating an output message directed to the UE based on the input message, the second ID and the salt value, wherein the output message, when received by the UE, allows the UE to obtain the second ID and to compare the second ID with one or more entries of a look-up table stored at the UE, the look-up table including one or more additional second IDs obtained by hashing one or more additional first IDs with one or more additional salt values; and
a third computer-executable instruction set for sending the output message via a common channel shared by the UE and the other UEs.

16. An apparatus comprising:
a processor configured to receive a message including a salt value via a common channel shared by a plurality of user equipments (UEs), to transform a first identifier (ID) assigned to a UE to obtain a second ID for the UE using the first ID and the salt value, wherein:
the processor is further configured to obtain the second ID by hashing the first ID and the salt value, wherein the message, when received by the UE, allows the UE to obtain the second ID and to compare the second ID with one or more entries of a look-up table stored at the UE, the look-up table including one or more additional second IDs obtained by hashing one or more additional first IDs with one or more additional salt values, the second ID and the salt value were selected from values that are known to have no collisions among the UE and other UEs from the plurality of UEs, the processor is further configured to receive subsequent messages, the first ID being transformed for transmission of the message and each of the subsequent messages using a salt value that is changed each time the first ID is transformed for transmission and that is selected from the values that are known to have no collisions, and the processor is further configured to determine whether the received message is intended for the UE based on the second ID, wherein the determination includes:
obtaining a third ID from the input message, and
comparing the second ID to the third ID to determine whether the input message is directed for the UE; and
a memory coupled to the processor.

17. The apparatus of claim 16, wherein the processor is configured to obtain the salt value from the received message and to hash the first ID and the salt value to obtain the second ID.

18. The apparatus of claim 16, wherein the processor is configured to generate a cyclic redundancy check (CRC) based on the received message and the second ID, to obtain a UE-specific CRC from the received message, and to compare the generated CRC to the UE-specific CRC to determine whether the received message is intended for the UE.

19. The apparatus of claim 16, wherein the processor is configured to determine that the received message is intended for the UE, to obtain scheduling information from the received message, and to process a data transmission based on the scheduling information.

20. The apparatus of claim 16, wherein the received message is a paging message, a scheduling message, or a resource assignment message intended for the UE.

21. A method comprising:
receiving a message including a salt value via a common channel shared by a plurality of user equipments (UEs);
transforming a first identifier (ID) assigned to a UE to obtain a second ID for the UE using the first ID and the salt value, wherein:
the transforming comprises hashing the first ID and the salt value to obtain the second ID, and
the second ID and the salt value were selected from values that are known to have no collisions among the UE and other UEs from the plurality of UEs, and
wherein the message, when received by the UE, allows the UE to obtain the second ID and to compare the second ID with one or more entries of a look-up table stored at the UE, the look-up table including one or more additional second IDs obtained by hashing one or more additional first IDs with one or more additional salt values;
receiving subsequent messages, the first ID being transformed for transmission of the message and each of the subsequent messages using a salt value that is changed each time the first ID is transformed for transmission and that is selected from the values that are known to have no collisions; and
determining whether the received message is intended for the UE based on the second ID, wherein the determining whether the received message is intended for the UE comprises obtaining a third ID from the received message, and comparing the second ID to the third ID to determine whether the received message is intended for the UE.

22. The method of claim 21, wherein the determining whether the received message is intended for the UE comprises generating a cyclic redundancy check (CRC) based on the received message and the second ID, obtaining a UE-specific CRC from the received message, and comparing the generated CRC to the UE-specific CRC to determine whether the received message is intended for the UE.

23. An apparatus comprising:
means for receiving a message including an indication of a salt value via a common channel shared by a plurality of user equipments (UEs);
means for transforming a first identifier (ID) assigned to a UE to obtain a second ID for the UE using the first ID and the salt value, wherein:
the means for transforming the first ID comprises means for hashing the first ID and the salt value to obtain the second ID, and
the second ID and the salt value were selected from values that are known to have no collisions among the UE and other UEs from the plurality of UEs, and
wherein the message, when received by the UE, allows the UE to obtain the second ID and to compare the second ID with one or more entries of a look-up table stored at the UE, the look-up table including one or more additional second IDs obtained by hashing one or more additional first IDs with one or more additional salt values;
means for receiving subsequent messages, the first ID being transformed for transmission of the message and each of the subsequent messages using a salt value that is changed each time the first ID is transformed for transmission and that is selected from the values that are known to have no collisions; and
means for determining whether the received message is intended for the UE based on the second ID, wherein the means for determining whether the received message is intended for the UE comprises means for obtaining a third ID from the received message, and means for comparing the second ID to the third ID to determine whether the received message is intended for the UE.

24. The apparatus of claim 23, wherein the means for determining whether the received message is intended for the UE comprises means for generating a cyclic redundancy check (CRC) based on the received message and the second ID, means for obtaining a UE-specific CRC from the received message, and means for comparing the generated CRC to the UE-specific CRC to determine whether the received message is intended for the UE.

25. A non-transitory computer-readable medium including computer-executable instructions stored thereon, comprising:
a first computer-executable instruction set for receiving a message including an indication of a salt value via a common channel shared by a plurality of user equipments (UEs);
a second computer-executable instruction set for transforming a first identifier (ID) assigned to a UE to obtain a second ID for the UE using the first ID and the salt value, wherein: the instruction set for transforming further comprises instructions for transforming the first ID by hashing the first ID and the salt value to obtain the second ID,
the second identifier and the salt value were selected from values that are known to have no collisions among the UE and other UEs from the plurality of UEs, and
wherein the message, when received by the UE, allows the UE to obtain the second ID and to compare the second ID with one or more entries of a look-up table stored at the UE, the look-up table including one or more additional second IDs obtained by hashing one or more additional first IDs with one or more additional salt values, and the first computer-executable instruction set is further for receiving subsequent messages, the first ID being transformed for transmission of the message and each of the subsequent messages using a salt value that is changed each time the first ID is transformed for transmission and that is selected from the values that are known to have no collisions; and a third computer-executable instruction set for determining whether the received message is intended for the UE based on the second ID, wherein the instruction set for determining whether the received message is intended for the UE comprises instructions for obtaining a third ID from the received message, and instructions for comparing the second ID to the third ID to determine whether the received message is intended for the UE.

26. The apparatus of claim 1, wherein the input message, the second ID, and the indication of the salt value are multiplexed to form the output message.

27. The apparatus of claim 1, wherein the processor is further configured to send no more than 4 output messages within a transmission time interval (TTI).

* * * * *